(12) United States Patent
Wallace

(10) Patent No.: US 10,761,524 B2
(45) Date of Patent: Sep. 1, 2020

(54) WIRELESS ADAPTER WITH PROCESS DIAGNOSTICS

(75) Inventor: Thomas C. Wallace, Lakeville, MN (US)

(73) Assignee: ROSEMOUNT INC., Shakopee, MN (US)

(*) Notice: Subject to any disclaimer, the term of this patent is extended or adjusted under 35 U.S.C. 154(b) by 319 days.

(21) Appl. No.: 12/855,128

(22) Filed: Aug. 12, 2010

(65) Prior Publication Data

US 2012/0041582 A1 Feb. 16, 2012

(51) Int. Cl.
*G05B 23/02* (2006.01)

(52) U.S. Cl.
CPC ............ *G05B 23/0224* (2013.01); *G05B 2219/24084* (2013.01); *G05B 2219/31121* (2013.01); *G05B 2219/33192* (2013.01)

(58) Field of Classification Search
CPC ...... G05B 23/0224; G05B 2219/33192; G05B 2219/31121; G05B 2219/24084
USPC .......................................... 702/183; 700/108
See application file for complete search history.

(56) References Cited

U.S. PATENT DOCUMENTS

| | | |
|---|---|---|
| 2,533,339 A | 12/1950 | Willenborg .................. 177/311 |
| 2,640,667 A | 6/1953 | Winn .............................. 248/65 |
| 2,883,489 A | 4/1959 | Eadie, Jr. et al. ............ 335/148 |
| 3,012,432 A | 12/1961 | Moore et al. ..................... 73/40 |
| 3,218,863 A | 11/1965 | Calvert .......................... 73/398 |
| 3,229,759 A | 1/1966 | Grover et al. ................ 165/105 |
| 3,232,712 A | 2/1966 | Stearns ........................... 23/255 |
| 3,249,833 A | 5/1966 | Vosteen ........................ 317/246 |
| 3,374,112 A | 3/1968 | Danon .......................... 117/226 |
| 3,557,621 A | 1/1971 | Ferran ............................ 73/398 |
| 3,568,762 A | 3/1971 | Harbaugh .................... 165/105 |
| 3,612,851 A | 10/1971 | Fowler ........................... 362/30 |
| 3,631,264 A | 12/1971 | Morgan ........................ 327/309 |
| 3,633,053 A | 1/1972 | Peters ............................ 310/15 |

(Continued)

FOREIGN PATENT DOCUMENTS

| | | |
|---|---|---|
| CH | 672 368 A5 | 11/1989 |
| CN | 06 199284 A | 7/1994 |

(Continued)

OTHER PUBLICATIONS

U.S. Appl. No. 12/485,169, filed Jun. 16, 2009.

(Continued)

*Primary Examiner* — Alexander Satanovsky
(74) *Attorney, Agent, or Firm* — Westman, Champlin & Koehler, P.A.

(57) ABSTRACT

A process device with diagnostics for use in an industrial process includes a process variable sensor or controller element which is configured to sense or control a process variable of a process fluid of the industrial process. Circuitry is coupled to the process variable sensor or control element and configured to measure or control a process variable of the industrial process. A wireless communication adapter includes wireless communication circuitry configured to communicate in the industrial process. The wireless communication circuitry is further configured to receive a process signal from another process device. Diagnostic circuitry is configured to diagnose operation of the industrial process as a function of the sensed process variable and the received process signal.

22 Claims, 6 Drawing Sheets

(56) References Cited

U.S. PATENT DOCUMENTS

| | | | |
|---|---|---|---|
| 3,697,835 A | 10/1972 | Satori | 317/246 |
| D225,743 S | 1/1973 | Seltzer | D10/102 |
| 3,742,450 A | 6/1973 | Weller | 375/257 |
| 3,808,480 A | 4/1974 | Johnston | 317/256 |
| 3,881,962 A | 5/1975 | Rubinstein | 136/209 |
| 3,885,432 A | 5/1975 | Herzl | 73/861.22 |
| 3,924,219 A | 12/1975 | Braun | 338/34 |
| 3,931,532 A | 1/1976 | Byrd | 310/4 |
| 4,005,319 A | 1/1977 | Nilsson et al. | 310/8.3 |
| 4,008,619 A | 2/1977 | Alcaide et al. | 73/398 |
| 4,042,757 A | 8/1977 | Jones | 429/104 |
| 4,063,349 A | 12/1977 | Passler et al. | 29/627 |
| 4,084,155 A | 4/1978 | Herzl et al. | 340/870.39 |
| 4,116,060 A | 9/1978 | Frederick | 73/861.22 |
| 4,125,122 A | 11/1978 | Stachurski | 136/205 |
| 4,137,515 A | 1/1979 | Akao | 336/205 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,230,156 A | 10/1980 | Frantz | 137/625.5 |
| 4,287,553 A | 9/1981 | Braunlich | 361/283 |
| 4,295,179 A | 10/1981 | Read | 361/600 |
| 4,322,724 A | 3/1982 | Grudzinski | 340/595 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,361,045 A | 11/1982 | Iwasaki | 73/654 |
| 4,370,890 A | 2/1983 | Frick | 73/718 |
| 4,383,801 A | 5/1983 | Pryor | 416/17 |
| 4,389,895 A | 6/1983 | Rud, Jr. | 73/724 |
| 4,390,321 A | 6/1983 | Langlois et al. | 417/15 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,459,537 A | 7/1984 | McWhorter | |
| 4,475,047 A | 10/1984 | Ebert | 307/66 |
| 4,476,853 A | 10/1984 | Arbogast | 126/578 |
| 4,485,670 A | 12/1984 | Camarda et al. | 73/179 |
| 4,490,773 A | 12/1984 | Moffatt | 361/283 |
| 4,510,400 A | 4/1985 | Kiteley | 307/66 |
| 4,542,436 A | 9/1985 | Carusillo | 361/283 |
| 4,562,742 A | 1/1986 | Bell | 73/718 |
| 4,570,217 A | 2/1986 | Allen et al. | 700/19 |
| 4,590,466 A | 5/1986 | Wiklund et al. | 340/870.28 |
| 4,639,542 A | 1/1987 | Bass et al. | 136/210 |
| 4,670,733 A | 6/1987 | Bell | 338/36 |
| 4,701,938 A | 10/1987 | Bell | 375/257 |
| 4,704,607 A | 11/1987 | Teather et al. | 340/825.07 |
| 4,749,993 A | 6/1988 | Szabo et al. | 340/870.31 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 4,982,412 A | 1/1991 | Gross | 377/6 |
| 5,009,311 A | 4/1991 | Schenk | 206/332 |
| 5,014,176 A | 5/1991 | Kelleher et al. | 363/26 |
| 5,023,746 A | 6/1991 | Epstein | 361/56 |
| 5,025,202 A | 6/1991 | Ishii et al. | 220/41 |
| 5,045,963 A | 9/1991 | Hansen et al. | 361/87 |
| 5,060,295 A | 10/1991 | Borras et al. | 455/186 |
| 5,079,562 A | 1/1992 | Yarsunas et al. | 343/792 |
| 5,094,109 A | 3/1992 | Dean et al. | 73/718 |
| 5,107,366 A | 4/1992 | Huang et al. | 359/223.1 |
| 5,148,089 A * | 9/1992 | Adachi | H02P 23/186 318/66 |
| D331,370 S | 12/1992 | Williams | D10/46 |
| 5,168,419 A | 12/1992 | Delatorre | 361/283 |
| 5,170,671 A | 12/1992 | Miau et al. | 73/861.22 |
| 5,194,819 A | 3/1993 | Briefer | 73/718 |
| 5,223,763 A | 6/1993 | Chang | 310/339 |
| 5,230,250 A | 7/1993 | Delatorre | 73/733 |
| 5,233,875 A | 8/1993 | Obermeier et al. | 73/718 |
| D345,107 S | 3/1994 | Williams | D10/46 |
| 5,313,831 A | 5/1994 | Beckman | 73/204.24 |
| 5,329,818 A | 7/1994 | Frick et al. | 73/708 |
| 5,361,650 A | 11/1994 | Klecker | 174/521 |
| 5,412,535 A | 5/1995 | Chao et al. | 361/700 |
| 5,492,016 A | 2/1996 | Pinto et al. | 73/724 |
| 5,495,769 A | 3/1996 | Broden et al. | 73/18 |
| 5,506,757 A | 4/1996 | Brorby | 361/796 |
| 5,531,936 A | 7/1996 | Kanatzidis et al. | 252/587 |
| 5,535,243 A | 7/1996 | Voegele et al. | 375/259 |
| 5,542,300 A | 8/1996 | Lee | 73/724 |
| 5,546,804 A | 8/1996 | Johnson et al. | 73/431 |
| 5,554,809 A | 9/1996 | Tobita et al. | 73/700 |
| 5,554,922 A | 9/1996 | Kunkel | 322/3 |
| 5,599,172 A | 2/1997 | McCabe | 417/334 |
| 5,606,513 A | 2/1997 | Louwagie et al. | 702/138 |
| 5,610,552 A | 3/1997 | Schlesinger et al. | 327/560 |
| 5,614,128 A | 3/1997 | Kanatzidis et al. | 252/582 |
| 5,618,471 A | 4/1997 | Kanatzidis et al. | 252/582 |
| 5,637,802 A | 6/1997 | Frick et al. | 73/724 |
| 5,642,301 A | 6/1997 | Warrior et al. | 364/571.02 |
| 5,644,185 A | 7/1997 | Miller | 310/306 |
| 5,656,782 A | 8/1997 | Powell, II et al. | 73/756 |
| 5,665,899 A | 9/1997 | Willcox | 731/1.63 |
| 5,672,832 A | 9/1997 | Cucci et al. | 73/861.52 |
| 5,682,476 A | 10/1997 | Tapperson et al. | 395/200.05 |
| 5,705,978 A | 1/1998 | Frick et al. | 340/511 |
| 5,710,552 A | 1/1998 | McCoy et al. | 340/870.21 |
| 5,722,249 A | 3/1998 | Miller, Jr. | 62/238.2 |
| 5,726,845 A | 3/1998 | Ho | |
| 5,726,846 A | 3/1998 | Houbre | 361/93 |
| 5,754,419 A | 5/1998 | Ho | |
| 5,757,608 A | 5/1998 | Bernot et al. | 361/283.4 |
| 5,764,891 A | 6/1998 | Warrior | 710/72 |
| 5,787,120 A | 7/1998 | Louagie et al. | 375/257 |
| 5,793,963 A | 8/1998 | Tapperson et al. | 395/200.31 |
| 5,803,604 A | 9/1998 | Pompei | 374/181 |
| 5,811,201 A | 9/1998 | Skowronski | 429/17 |
| 5,851,083 A | 12/1998 | Palan | 403/337 |
| 5,870,695 A | 2/1999 | Brown et al. | 702/138 |
| 5,872,494 A | 2/1999 | Palan et al. | 333/252 |
| 5,899,962 A | 5/1999 | Louwagie et al. | 702/138 |
| 5,911,162 A | 6/1999 | Denner | 73/718 |
| 5,929,372 A | 7/1999 | Oudoire et al. | 136/208 |
| 5,954,526 A | 9/1999 | Smith | 439/136 |
| 5,957,727 A | 9/1999 | Page, Jr. | 439/607.58 |
| 5,978,658 A | 11/1999 | Shoji | 455/66 |
| 5,992,240 A | 11/1999 | Tsuruoka et al. | 73/718 |
| 6,013,204 A | 1/2000 | Kanatzidis et al. | 252/584 |
| 6,020,648 A | 2/2000 | MacPherson | 257/787 |
| 6,038,927 A | 3/2000 | Karas | 73/706 |
| 6,062,095 A | 5/2000 | Mulrooney et al. | 73/866.5 |
| 6,079,276 A | 6/2000 | Frick et al. | 73/18 |
| 6,104,759 A | 8/2000 | Carkner et al. | 375/295 |
| 6,109,979 A | 8/2000 | Garnett | 439/709 |
| 6,126,327 A | 10/2000 | Bi et al. | 709/221 |
| 6,127,739 A | 10/2000 | Appa | 290/55 |
| 6,150,798 A | 11/2000 | Ferry et al. | 323/273 |
| D439,177 S | 3/2001 | Fandrey et al. | D10/46 |
| D439,178 S | 3/2001 | Fandrey et al. | D10/46 |
| D439,179 S | 3/2001 | Fandrey et al. | D10/46 |
| D439,180 S | 3/2001 | Fandrey et al. | D10/85 |
| D439,181 S | 3/2001 | Fandrey et al. | D10/46 |
| D441,672 S | 5/2001 | Fandrey et al. | D10/52 |
| 6,236,096 B1 | 5/2001 | Chang et al. | 257/419 |
| 6,236,334 B1 | 5/2001 | Tapperson et al. | 340/825 |
| 6,255,010 B1 | 7/2001 | George et al. | 429/30 |
| 6,282,247 B1 | 8/2001 | Shen | 375/285 |
| 6,295,875 B1 | 10/2001 | Frick et al. | 73/718 |
| 6,312,617 B1 | 11/2001 | Kanatzidis et al. | 252/62.3 |
| 6,326,764 B1 | 12/2001 | Virtudes | 320/101 |
| 6,338,283 B1 | 1/2002 | Blazquez Navarro | 73/865.8 |
| 6,360,277 B1 | 3/2002 | Ruckley et al. | 709/250 |
| 6,366,436 B1 | 4/2002 | Maier et al. | 361/93.9 |
| 6,385,972 B1 | 5/2002 | Fellows | 60/517 |
| 6,405,139 B1 | 6/2002 | Kicinski et al. | 702/33 |

(56) References Cited

U.S. PATENT DOCUMENTS

| | | | |
|---|---|---|---|
| 6,429,786 B1 | 8/2002 | Bansemir et al. | 340/870.27 |
| 6,441,747 B1 | 8/2002 | Khair et al. | 340/870.16 |
| 6,457,367 B1 | 10/2002 | Behm et al. | 73/753 |
| 6,480,699 B1 | 11/2002 | Lovoi | 455/41.2 |
| 6,484,107 B1 | 11/2002 | Roper et al. | 702/50 |
| 6,487,912 B1 | 12/2002 | Behm et al. | 73/753 |
| 6,504,489 B1 | 1/2003 | Westfield et al. | 340/870.3 |
| 6,508,131 B2 | 1/2003 | Frick | 73/756 |
| 6,510,740 B1 | 1/2003 | Behm et al. | 73/708 |
| 6,511,337 B1 | 1/2003 | Fandrey et al. | 439/320 |
| D471,829 S | 4/2003 | Dennis et al. | D10/85 |
| D472,831 S | 4/2003 | Dennis et al. | D10/85 |
| 6,546,805 B2 | 4/2003 | Fandrey et al. | 73/753 |
| 6,553,076 B1 | 4/2003 | Huang | 375/257 |
| 6,563,908 B1 | 5/2003 | Enck, Jr. | 378/123 |
| 6,568,279 B2 | 5/2003 | Behm et al. | 73/753 |
| 6,571,132 B1 | 5/2003 | Davis et al. | 700/2 |
| 6,574,515 B1 | 6/2003 | Kirkpatrick et al. | 700/19 |
| 6,593,857 B1 | 7/2003 | Roper et al. | 340/870.3 |
| 6,609,427 B1 | 8/2003 | Westfield et al. | 73/753 |
| 6,661,220 B1 | 12/2003 | Glehr | 324/207.17 |
| 6,662,662 B1 | 12/2003 | Nord et al. | 73/715 |
| 6,667,594 B2 | 12/2003 | Chian | 318/696 |
| 6,680,690 B1 | 1/2004 | Nilsson et al. | 342/124 |
| 6,690,182 B2 | 2/2004 | Kelly et al. | 324/700 |
| 6,711,446 B2 | 3/2004 | Kirkpatrick et al. | 700/19 |
| 6,747,573 B1 | 6/2004 | Gerlach et al. | 340/870.21 |
| 6,765,968 B1 | 7/2004 | Nelson et al. | 375/257 |
| 6,771,560 B2 | 8/2004 | Lyon et al. | 367/13 |
| 6,774,814 B2 | 8/2004 | Hilleary | 340/870.07 |
| 6,778,100 B2 | 8/2004 | Schempf | 340/870.07 |
| 6,792,259 B1 | 9/2004 | Parise | 455/343.1 |
| 6,823,072 B1 | 11/2004 | Hoover | 381/7 |
| 6,838,859 B2 | 1/2005 | Shah | 322/38 |
| 6,839,546 B2 | 1/2005 | Hedtke | 455/67.11 |
| 6,839,790 B2 | 1/2005 | Barros De Almeida et al. | 710/305 |
| 6,843,110 B2 | 1/2005 | Deane et al. | 73/114.35 |
| 6,891,477 B2 | 5/2005 | Aronstam | 340/606 |
| 6,891,838 B1 | 5/2005 | Petite et al. | 370/401 |
| 6,898,980 B2 | 5/2005 | Behm et al. | 73/116 |
| 6,904,295 B2 | 6/2005 | Yang | 455/522 |
| 6,907,383 B2 | 6/2005 | Eryurek et al. | 702/183 |
| 6,910,332 B2 | 6/2005 | Fellows | 60/520 |
| 6,942,728 B2 | 9/2005 | Caillat et al. | 117/3 |
| 6,961,665 B2 | 11/2005 | Slezak | 702/61 |
| 6,984,899 B1 | 1/2006 | Rice | 290/44 |
| 6,995,677 B2 | 2/2006 | Aronstam et al. | 340/606 |
| 6,995,685 B2 | 2/2006 | Randall | 340/870.39 |
| 7,010,294 B1 | 3/2006 | Pyotsia et al. | 455/420 |
| 7,036,983 B2 | 5/2006 | Green et al. | 374/179 |
| 7,043,250 B1 * | 5/2006 | DeMartino | 455/445 |
| 7,058,542 B2 | 6/2006 | Hauhia et al. | 702/183 |
| 7,073,394 B2 | 7/2006 | Foster | 73/861.22 |
| 7,085,610 B2 | 8/2006 | Eryurek et al. | 700/29 |
| 7,088,285 B2 | 8/2006 | Smith | 342/124 |
| 7,109,883 B2 | 9/2006 | Trimble et al. | 340/870.16 |
| 7,116,036 B2 | 10/2006 | Balasubramaniam et al. | 310/322 |
| 7,129,663 B2 | 10/2006 | Suzuki | |
| 7,136,725 B1 | 11/2006 | Paciorek et al. | 700/295 |
| 7,173,343 B2 | 2/2007 | Kugel | 290/1 R |
| 7,197,953 B2 | 4/2007 | Olin | 73/866.5 |
| 7,233,745 B2 | 6/2007 | Loechner | 398/128 |
| 7,262,693 B2 | 8/2007 | Karschnia et al. | 340/508 |
| 7,271,679 B2 | 9/2007 | Lundberg et al. | 333/24 |
| 7,301,454 B2 | 11/2007 | Seyfang et al. | 340/539.26 |
| 7,319,191 B2 | 1/2008 | Poon et al. | 174/50.62 |
| 7,329,959 B2 | 2/2008 | Kim et al. | 290/2 |
| 7,351,098 B2 | 4/2008 | Gladd et al. | 439/578 |
| 7,504,807 B2 | 3/2009 | Kataoka | 323/268 |
| 7,518,553 B2 | 4/2009 | Zhang et al. | 343/700 MS |
| 7,539,593 B2 * | 5/2009 | Machacek | 702/127 |
| 7,560,907 B2 | 7/2009 | Nelson | 322/37 |
| 7,626,141 B2 | 12/2009 | Rodriguez-Medina et al. | 219/260 |
| 7,680,460 B2 | 3/2010 | Nelson et al. | 455/67.11 |
| 7,726,017 B2 | 6/2010 | Evans et al. | 29/854 |
| 7,835,119 B2 | 11/2010 | Florence et al. | |
| 7,983,049 B2 | 7/2011 | Leifer et al. | 361/728 |
| 8,005,514 B2 | 8/2011 | Saito et al. | 455/572 |
| 8,150,462 B2 | 4/2012 | Guenter et al. | 455/557 |
| 8,160,535 B2 | 4/2012 | Kielb et al. | 455/343 |
| 8,180,948 B2 | 5/2012 | Kreider et al. | 710/313 |
| 8,208,581 B2 | 6/2012 | Westfield et al. | 375/295 |
| 8,452,255 B2 | 5/2013 | Orth | 455/343.5 |
| 8,538,560 B2 | 9/2013 | Brown et al. | 700/22 |
| 2001/0025349 A1 | 9/2001 | Sharood et al. | 713/340 |
| 2002/0011115 A1 | 1/2002 | Frick | 73/718 |
| 2002/0029130 A1 | 3/2002 | Eryurek et al. | 702/183 |
| 2002/0029900 A1 | 3/2002 | Wimberger Friedl et al. | 174/258 |
| 2002/0065631 A1 | 5/2002 | Loechner | 702/188 |
| 2002/0082799 A1 | 6/2002 | Pramanik | 702/130 |
| 2002/0095243 A1 | 7/2002 | Wettstein et al. | 709/253 |
| 2002/0097031 A1 | 7/2002 | Cook et al. | 323/273 |
| 2002/0105968 A1 | 8/2002 | Pruzan et al. | 370/465 |
| 2002/0148236 A1 | 10/2002 | Bell | 62/3.3 |
| 2002/0163323 A1 | 11/2002 | Kasai et al. | 323/284 |
| 2003/0032993 A1 | 2/2003 | Mickle et al. | 600/509 |
| 2003/0042740 A1 | 3/2003 | Holder et al. | 290/1 A |
| 2003/0043052 A1 * | 3/2003 | Tapperson et al. | 340/825.37 |
| 2003/0079553 A1 | 5/2003 | Cain et al. | 73/861.27 |
| 2003/0083038 A1 | 5/2003 | Poon et al. | 455/344 |
| 2003/0097521 A1 | 5/2003 | Pfandler et al. | 711/103 |
| 2003/0134161 A1 | 7/2003 | Gore et al. | 429/12 |
| 2003/0143958 A1 | 7/2003 | Elias et al. | 455/73 |
| 2003/0167631 A1 | 9/2003 | Hallenbeck | 29/835 |
| 2003/0171827 A1 | 9/2003 | Keyes et al. | 700/19 |
| 2003/0199778 A1 | 10/2003 | Mickle et al. | 600/509 |
| 2003/0204371 A1 | 10/2003 | Sciamanna | 702/183 |
| 2004/0081872 A1 | 4/2004 | Herman et al. | 429/26 |
| 2004/0085240 A1 | 5/2004 | Faust | 342/124 |
| 2004/0086021 A1 | 5/2004 | Litwin | 374/120 |
| 2004/0117157 A1 * | 6/2004 | Bantz | H04L 67/12 702/188 |
| 2004/0124854 A1 | 7/2004 | Slezak | 324/644 |
| 2004/0142733 A1 | 7/2004 | Parise | 455/572 |
| 2004/0159235 A1 | 8/2004 | Marganski et al. | 95/116 |
| 2004/0183550 A1 | 9/2004 | Fehrenbach et al. | 27/26 |
| 2004/0184517 A1 | 9/2004 | Westfield et al. | 375/219 |
| 2004/0199681 A1 | 10/2004 | Hedtke | 710/37 |
| 2004/0200519 A1 | 10/2004 | Sterzel et al. | 136/238 |
| 2004/0203421 A1 | 10/2004 | Hedtke | 455/67.11 |
| 2004/0203434 A1 | 10/2004 | Karschnia | 455/67.11 |
| 2004/0211456 A1 | 10/2004 | Brown et al. | 136/243 |
| 2004/0214543 A1 | 10/2004 | Osone et al. | 455/197.2 |
| 2004/0218326 A1 | 11/2004 | Duren et al. | 361/93.1 |
| 2004/0242169 A1 | 12/2004 | Albsmeier et al. | 455/91 |
| 2004/0249483 A1 | 12/2004 | Wojsznis et al. | 700/52 |
| 2004/0259533 A1 | 12/2004 | Nixon et al. | 455/414.1 |
| 2005/0011278 A1 | 1/2005 | Brown et al. | 73/861.18 |
| 2005/0017602 A1 | 1/2005 | Arms et al. | 310/339 |
| 2005/0023858 A1 | 2/2005 | Bingle et al. | 296/76 |
| 2005/0029236 A1 | 2/2005 | Gambino et al. | 219/121.69 |
| 2005/0040570 A1 | 2/2005 | Asselborn | 266/99 |
| 2005/0046615 A1 | 3/2005 | Blyth | 340/908 |
| 2005/0056106 A1 | 3/2005 | Nelson et al. | 73/866.3 |
| 2005/0072239 A1 | 4/2005 | Longsdorf et al. | 73/649 |
| 2005/0074324 A1 | 4/2005 | Yoo | 415/4.3 |
| 2005/0076944 A1 | 4/2005 | Kanatzidis et al. | 136/239 |
| 2005/0082949 A1 | 4/2005 | Tsujiura | 310/339 |
| 2005/0099010 A1 | 5/2005 | Hirsch | 290/42 |
| 2005/0106927 A1 | 5/2005 | Goto et al. | 439/404 |
| 2005/0109395 A1 | 5/2005 | Seberger | 137/8 |
| 2005/0115601 A1 | 6/2005 | Olsen et al. | 136/212 |
| 2005/0118468 A1 | 6/2005 | Adams et al. | 429/22 |
| 2005/0122653 A1 | 6/2005 | McCluskey et al. | 361/92 |
| 2005/0130605 A1 | 6/2005 | Karschnia et al. | 455/90.3 |
| 2005/0132808 A1 | 6/2005 | Brown et al. | 73/592 |
| 2005/0134148 A1 | 6/2005 | Buhler et al. | 310/339 |
| 2005/0139250 A1 | 6/2005 | DeSteese et al. | 136/212 |
| 2005/0146220 A1 | 7/2005 | Hamel et al. | 307/44 |

(56) References Cited

U.S. PATENT DOCUMENTS

| | | | |
|---|---|---|---|
| 2005/0153593 A1 | 7/2005 | Takayanagi et al. | 439/352 |
| 2005/0164684 A1 | 7/2005 | Chen et al. | 455/414.1 |
| 2005/0197803 A1 | 9/2005 | Eryurek et al. | 702/185 |
| 2005/0201349 A1 | 9/2005 | Budampati | 370/342 |
| 2005/0208908 A1 | 9/2005 | Karschnia et al. | 455/127.1 |
| 2005/0222698 A1 | 10/2005 | Eryurek et al. | 700/90 |
| 2005/0228509 A1 | 10/2005 | James | 700/19 |
| 2005/0235758 A1 | 10/2005 | Kowal et al. | 73/891.29 |
| 2005/0242979 A1 | 11/2005 | Hamilton et al. | 341/144 |
| 2005/0245291 A1 | 11/2005 | Brown et al. | 455/572 |
| 2005/0276233 A1 | 12/2005 | Shepard et al. | 370/254 |
| 2005/0281215 A1 | 12/2005 | Budampati et al. | 370/328 |
| 2005/0289276 A1* | 12/2005 | Karschnia et al. | 710/305 |
| 2006/0002368 A1 | 1/2006 | Budampati et al. | 370/351 |
| 2006/0028327 A1 | 2/2006 | Amis | 340/431 |
| 2006/0036404 A1 | 2/2006 | Wiklund et al. | 702/183 |
| 2006/0047480 A1 | 3/2006 | Lenz et al. | 702/183 |
| 2006/0058847 A1* | 3/2006 | Lenz et al. | 607/5 |
| 2006/0060236 A1 | 3/2006 | Kim et al. | 136/203 |
| 2006/0063522 A1 | 3/2006 | McFarland | 455/423 |
| 2006/0077917 A1 | 4/2006 | Brahmajosyula et al. | 370/310 |
| 2006/0092039 A1 | 5/2006 | Saito et al. | 340/825.37 |
| 2006/0111058 A1 | 5/2006 | Grant et al. | 455/127.1 |
| 2006/0116102 A1 | 6/2006 | Brown et al. | |
| 2006/0128689 A1 | 6/2006 | Gomtsyan et al. | 514/217.01 |
| 2006/0131428 A1 | 6/2006 | Wang et al. | 235/492 |
| 2006/0142875 A1 | 6/2006 | Keyes, IV et al. | 700/1 |
| 2006/0148410 A1 | 7/2006 | Nelson et al. | 455/67.11 |
| 2006/0181406 A1 | 8/2006 | Petite et al. | 340/521 |
| 2006/0194547 A1 | 8/2006 | Davis | 455/69 |
| 2006/0227779 A1 | 10/2006 | Budampati et al. | 370/389 |
| 2006/0274644 A1 | 12/2006 | Budampati et al. | 370/216 |
| 2006/0274671 A1 | 12/2006 | Budampati et al. | 370/254 |
| 2006/0278023 A1 | 12/2006 | Gameyer et al. | 73/862.333 |
| 2006/0282580 A1 | 12/2006 | Russell et al. | 710/62 |
| 2006/0287001 A1 | 12/2006 | Budampati et al. | 455/552.1 |
| 2006/0290328 A1 | 12/2006 | Orth | 323/218 |
| 2007/0006528 A1 | 1/2007 | Diebold et al. | 48/197 R |
| 2007/0024256 A1 | 2/2007 | Chou | 323/268 |
| 2007/0030816 A1 | 2/2007 | Kolavennu | 370/252 |
| 2007/0030832 A1 | 2/2007 | Gonia et al. | 370/338 |
| 2007/0039371 A1 | 2/2007 | Omata et al. | 73/9 |
| 2007/0054630 A1 | 3/2007 | Scheible et al. | 455/90.3 |
| 2007/0055463 A1 | 3/2007 | Florenz et al. | 702/50 |
| 2007/0079250 A1 | 4/2007 | Bump et al. | 715/762 |
| 2007/0135867 A1 | 6/2007 | Klosterman et al. | 607/60 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0273496 A1 | 11/2007 | Hedtke | 340/506 |
| 2007/0275755 A1 | 11/2007 | Chae et al. | 455/557 |
| 2007/0279009 A1 | 12/2007 | Kobayashi | 320/166 |
| 2007/0280144 A1 | 12/2007 | Hodson et al. | 370/312 |
| 2007/0280178 A1 | 12/2007 | Hodson et al. | 370/338 |
| 2007/0280286 A1 | 12/2007 | Hodson et al. | 370/466 |
| 2007/0280287 A1 | 12/2007 | Samudrala et al. | 370/466 |
| 2007/0282463 A1 | 12/2007 | Hodson et al. | 700/20 |
| 2007/0285224 A1 | 12/2007 | Karschnia et al. | 340/538 |
| 2007/0288204 A1 | 12/2007 | Gienke et al. | 702/188 |
| 2008/0010600 A1 | 1/2008 | Katano | 715/748 |
| 2008/0030423 A1 | 2/2008 | Shigemoto | 343/600 |
| 2008/0054645 A1 | 3/2008 | Kulkarni et al. | 290/52 |
| 2008/0079641 A1 | 4/2008 | Grunig et al. | |
| 2008/0083446 A1 | 4/2008 | Chakraborty et al. | 136/205 |
| 2008/0088464 A1 | 4/2008 | Gutierrez | 340/606 |
| 2008/0114911 A1 | 5/2008 | Schumacher | 710/72 |
| 2008/0123581 A1 | 5/2008 | Wells et al. | 370/315 |
| 2008/0141769 A1 | 6/2008 | Schmidt et al. | 73/204.19 |
| 2008/0145007 A1 | 6/2008 | Crumpton | 385/94 |
| 2008/0268784 A1 | 10/2008 | Kantzes et al. | 455/66.1 |
| 2008/0273486 A1 | 11/2008 | Pratt et al. | 370/328 |
| 2008/0280568 A1* | 11/2008 | Kielb et al. | 455/74.1 |
| 2008/0310195 A1 | 12/2008 | Seberger et al. | 363/26 |
| 2009/0015216 A1 | 1/2009 | Seberger et al. | 323/234 |
| 2009/0046732 A1* | 2/2009 | Pratt et al. | 370/406 |
| 2009/0066587 A1 | 3/2009 | Hayes et al. | 343/702 |
| 2009/0081957 A1 | 3/2009 | Sinreich | 455/68 |
| 2009/0083001 A1* | 3/2009 | Huisenga et al. | 702/185 |
| 2009/0102449 A1 | 4/2009 | Chang et al. | 323/311 |
| 2009/0120169 A1 | 5/2009 | Chandler et al. | 73/54.41 |
| 2009/0145656 A1 | 6/2009 | Tschudin | 174/521 |
| 2009/0146502 A1 | 6/2009 | Sinreich | 307/104 |
| 2009/0164050 A1* | 6/2009 | Ahmad | G01F 1/6847 700/282 |
| 2009/0167613 A1 | 7/2009 | Hershey et al. | 343/702 |
| 2009/0174570 A1* | 7/2009 | Hagg | G08C 17/02 340/870.31 |
| 2009/0195222 A1 | 8/2009 | Lu et al. | 322/3 |
| 2009/0200489 A1 | 8/2009 | Tappel et al. | 250/492.3 |
| 2009/0250340 A1 | 10/2009 | Sasaki et al. | 204/298.02 |
| 2009/0253388 A1 | 10/2009 | Kielb et al. | 455/117 |
| 2009/0260438 A1 | 10/2009 | Hedtke | 73/579 |
| 2009/0309558 A1 | 12/2009 | Kielb | 323/234 |
| 2009/0311975 A1 | 12/2009 | Vanderaa et al. | 455/90.3 |
| 2009/0311976 A1 | 12/2009 | Vanderaa et al. | 455/90.3 |
| 2009/1311971 | 12/2009 | Kielb et al. | 455/74.1 |
| 2010/0000316 A1 | 1/2010 | Fehrenbach et al. | 73/295 |
| 2010/0109331 A1 | 5/2010 | Hedtke et al. | |
| 2010/0156175 A1 | 6/2010 | Wei | 307/31 |
| 2010/0254900 A1 | 10/2010 | Campbell et al. | 424/1.65 |
| 2011/0053526 A1 | 3/2011 | Strei et al. | 455/90.3 |
| 2012/0129590 A1* | 5/2012 | Morrisroe | A63F 13/12 463/25 |
| 2012/0299564 A1 | 11/2012 | Howes et al. | 323/281 |
| 2013/0079895 A1 | 3/2013 | Hedtke | 700/9 |
| 2013/0207624 A1 | 8/2013 | Aaltonen et al. | 323/234 |

FOREIGN PATENT DOCUMENTS

| | | |
|---|---|---|
| CN | 1130435 A | 9/1996 |
| CN | 1251953 | 5/2000 |
| CN | 1 429 354 A | 7/2003 |
| CN | 1 442 822 A | 9/2003 |
| CN | 1969238 | 5/2007 |
| CN | 100386602 C | 5/2008 |
| CN | 101821686 | 9/2010 |
| CN | 102067048 | 5/2011 |
| CN | 202694194 | 1/2013 |
| DE | 2710211 | 9/1978 |
| DE | 3340834 A1 | 5/1985 |
| DE | 37 11 754 A1 | 10/1988 |
| DE | 38 42 379 A1 | 6/1990 |
| DE | 3842379 | 6/1990 |
| DE | 196 22 295 | 5/1996 |
| DE | 201 07 112 U1 | 7/2001 |
| DE | 101 04 582 A1 | 10/2001 |
| DE | 100 41 160 | 3/2002 |
| DE | 102 21 931 A1 | 5/2002 |
| DE | 10 2004 020 393 | 11/2005 |
| EP | 0 518 916 B1 | 2/1991 |
| EP | 0 524 550 A1 | 1/1993 |
| EP | 0729294 | 8/1996 |
| EP | 0 895 209 A1 | 2/1999 |
| EP | 0 945 714 | 9/1999 |
| EP | 1 202 145 A1 | 5/2002 |
| EP | 1 192 614 | 1/2003 |
| EP | 1 293 853 A1 | 3/2003 |
| EP | 1879294 | 1/2008 |
| FI | 118699 B | 2/2008 |
| GB | 1 397 435 A | 6/1975 |
| GB | 2 300 265 A | 10/1996 |
| GB | 2 403 043 | 6/2004 |
| JP | 01121236 | 8/1989 |
| JP | 2-35803 | 2/1990 |
| JP | 02067794 | 7/1990 |
| JP | 4-335796 | 11/1992 |
| JP | 8-125767 | 5/1996 |
| JP | 8-249997 | 9/1996 |
| JP | 9-065441 | 3/1997 |
| JP | 09-182308 | 7/1997 |
| JP | 11-257196 | 9/1999 |
| JP | 2001-524226 | 11/2001 |
| JP | 2002369554 | 12/2002 |
| JP | 2003/042881 | 2/2003 |

(56) References Cited

FOREIGN PATENT DOCUMENTS

| | | |
|---|---|---|
| JP | 2003-051894 | 2/2003 |
| JP | 2003051894 | 2/2003 |
| JP | 2003134261 | 5/2003 |
| JP | 2003-195903 | 7/2003 |
| JP | 2004021877 | 1/2004 |
| JP | 2004 146254 | 5/2004 |
| JP | 2004208476 | 7/2004 |
| JP | 2004-317593 | 11/2004 |
| JP | 2005-505822 | 2/2005 |
| JP | 2005-122744 | 5/2005 |
| JP | 2005-207648 | 7/2005 |
| JP | 2006-014589 | 1/2006 |
| JP | 2006039892 A | 2/2006 |
| JP | 2006-180603 | 7/2006 |
| JP | 2007-200940 | 8/2007 |
| JP | 2008-17663 | 1/2008 |
| JP | 2008-504790 | 2/2008 |
| JP | 200842237 | 2/2008 |
| JP | 2008-511938 | 4/2008 |
| JP | 2008-511938 A | 4/2008 |
| JP | 2008-527493 | 7/2008 |
| JP | 2009-106145 | 5/2009 |
| JP | 2010-033510 | 2/2010 |
| JP | 2010-530211 | 9/2010 |
| JP | 2010-541099 | 12/2010 |
| JP | 2011-524588 A | 9/2011 |
| RU | 2 131 934 C1 | 6/1999 |
| RU | 2168062 | 5/2001 |
| RU | 2342639 C2 | 8/2003 |
| RU | 2003128989 | 1/2007 |
| WO | WO 91/13417 | 9/1991 |
| WO | WO 95/07522 | 3/1995 |
| WO | WO 96/12993 | 5/1996 |
| WO | WO 99/53286 | 10/1999 |
| WO | WO 01/01742 | 1/2001 |
| WO | WO 2001/48723 | 7/2001 |
| WO | WO 2001/51836 | 7/2001 |
| WO | WO 01/76148 | 10/2001 |
| WO | WO 2002/05241 | 1/2002 |
| WO | WO 03/023536 | 3/2003 |
| WO | WO 03/089881 | 10/2003 |
| WO | WO 2004/038998 | 5/2004 |
| WO | WO 2004/082051 | 9/2004 |
| WO | WO 2004/094892 | 11/2004 |
| WO | WO 2005/060482 | 7/2005 |
| WO | WO 2005/086331 | 9/2005 |
| WO | WO 2006/026749 | 3/2006 |
| WO | WO 2006/109362 | 10/2006 |
| WO | WO 2007/002769 | 1/2007 |
| WO | WO 2007/031435 | 3/2007 |
| WO | WO 2007/037988 | 4/2007 |
| WO | WO 2008/0098583 | 8/2008 |
| WO | WO 2009/003146 | 12/2008 |
| WO | WO 2009/003148 | 12/2008 |
| WO | WO 2009/063056 | 5/2009 |

OTHER PUBLICATIONS

U.S. Appl. No. 12/485,189, filed Jun. 16, 2009.
U.S. Appl. No. 12/486,282, filed Jun. 17, 2009.
U.S. Appl. No. 12/486,269, filed Jun. 17, 2009.
U.S. Appl. No. 12/486,253, filed Jun. 17, 2009.
The International Search Report and Written Opinion in Application No. PCT/US2009/003619, dated Sep. 30, 2009.
Office Action from Chinese patent Application No. 2005800142124, dated Mar. 14, 2008.
Office Action from Chinese patent Application No. 200580006438.X, filed Mar. 2, 2005.
Examiner's Consultation from European patent Application No. 05724190.3, dated Jun. 30, 2008.
Office Action from Russian Patent Office in Russian Serial No. 2006145434.
The Official Communication in Application No. 2006/145434, filed May 5, 2005.
Office Action from European Application No. 05746241.8, dated Aug. 29, 2007.
"Wireless R&D Aims to Boos Traffic," by M. Moore, InTech with Industrial Computing, Feb. 2002, pp. 40-41.
"System Checks Farawy Machines' Health," by J. Strothman, InTech with Industrial Computing, Feb. 2002, pp. 42-43.
Notification of Transmittal of the International Search Report or the Declaration—PCT/US03/10403.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. Ii, iii, iv and 1-12, Dec. 2003.
International Search Report and Written Opinion of Application No. PCT/US2005/015848, file May 5, 2005.
"Wireless Dual Analog Input Interface Transmitter Installation and User's Manual", by Honeywell International Inc., Phoenix, Arizona, pp. Ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
Notification of Transmittal of the International Search Report and the Written Opinion—PCT/US2005/021757.
International Search Report for International Application No. PCT/US 03/27561, filed Mar. 9, 2003, dated Jun. 15, 2004.
2002 Microchip Technology Inc., "Stand-Alone CAN Controller with SPI™ Interface," pp. 1-75, Mar. 1, 2002.
Rosemount Reference Manual 00809-0100-4022, Rev AA, Jul. 2002, "Model 4600 Oil & Gas Panel Transmitter," 65 pages.
Transmitter Schematic, Sold Jul. 2002, 5 pages.
Notification of Transmittal of the International Seaarch Report and the Written Opinion of the International Searching Authority for International Application No. PCT/US2005/007328 filed Mar. 7, 2005. dated Jan. 12, 2006.
4 Pages from Website http://content.honeywell.com/ime/eznews/eznews0403/news.htm, 2004.
Notification of Transmittal of the International Search Report and the Written Opinion of the International Searching Authority for International Application No. PCT/US2006/025206 filed Jun. 27, 2006.
"Mechatronic Drives in Mobile Hydraulics," Internet Article, Soncebox News. No. 4, Oct. 2004.
USA & Metric Thread Standards http://www.carrlane.com/Catalog/index.cfm/29425071F0B221118070C1C513906103E0B05543B0B012009083C3B285357474A2D020609090C0015312A36515F554A5B.
U.S. Appl. No. 61/012,262, filed Dec. 7, 2007.
U.S. Appl. No. 60/937,396, filed Jun. 26, 2007.
U.S. Appl. No. 60/937,397, filed Jun. 26, 2007.
Office Action from European Application No. 05853808.3, dated Nov. 5, 2007.
Office Action from U.S. Patent Office in U.S. Appl. No. 11/028,486, dated Nov. 13, 2007.
Office Action from U.S. Patent Office in U.S. Appl. No. 11/028,486 dated May 9, 2008.
Notification of Transmittal of the International Search Report and Written Opinion, PCT/US2009/0036616, dated Jan. 13, 2010.
"Written Opinion of the International Searching Authority" for PCT/US2008/011451 filed Oct. 3, 2008; dated Mar. 31, 2009; 10 pages.
"Notification of Transmittal of the International Search Report and The Written Opinion of the International Searching Authority" for PCT/US2008/011451 filed Oct. 3, 2008; dated Mar. 30, 2009; 3 pages.

(56) References Cited

OTHER PUBLICATIONS

"International Search Report" for PCT/US2008/011451 filed Oct. 3, 2008; dated Mar. 31, 2009; 4 pages.
The International Search Report and Written Opinion in Appln No. PCT/US2005/021757, filed Jun. 21, 2005.
The International Search Report and Written Opinion in Application No. PCT/US2006/035728, filed Sep. 13, 2006.
The International Search Report and Written Opinion in Application No. PCT/US2009/003636, dated Oct. 6, 2009.
The International Search Report and Written Opinion in Application No. PCT/US2009/003611, dated Nov. 4, 2009.
The International Search Report and Written Opinion in Application No. PCT/US2009/003621, dated Sep. 30, 2009.
Summons to attend oral proceedings for the European application No. 05746241.8 dated May 26, 2010.
The sixth Office Action from Chinese application No. 2005800014212.4, dated Aug. 17, 2010.
Rejection Notice for Japanese patent application No. 2007527282, dated Jul. 28, 2010.
Notification of Transmittal of the International Search Report and the Written Opinion for International application No. PCT/US2009/062152.
First Office Action for Chinese application No. 200780018710.5 dated May 12, 2010.
The 7th Office Action from related Chinese Patent Application No. 2005/0014212.4 dated Jan. 31, 2011.
Office Action from corresponding European Application No. EP 09767062.4, dated Jul. 13, 2011, 5 pgs.
Office Action from Chinese patent Application No. 200580006438.X dated Jul. 9, 2008.
The second Office Action from Chinese patent Application No. 2005800142124 filed May 5, 2005.
Notification of Transmittal of the International Search Report and the Written Opinion for the international patent application No. PCT/US2010/047463 dated Dec. 1, 2010.
The International Search Report and Written Opinion in Application No. PCT/US2009/003616, dated Jan. 13, 2010.
Conclusion and Notification on rehearing for Russian patent application No. 2006145434/09 issued on Sep. 17, 2010.
First Office Action for Chinese patent application 200680015575.4, filed Jun. 27, 2006.
Search Report and Written Opinion for international patent application No. PCT/US2009/002476, dated Apr. 21, 2009.
Third Office Action from Chinese patent application No. 200580006438.X, dated Sep. 28, 2009.
Second Official Action from Russian patent application No. 2008116682, dated Apr. 13, 2009.
First Official Action from Russian patent application No. 2006134646, dated Mar. 12, 2008.
First Official Action from Russian patent application No. 2008103014, dated Jun. 9, 2009.
First Communication from European patent application No. 06803540.1, dated Jun. 30, 2008.
Fifth Office Action from Chinese patent application No. 200580014212.4, dated Nov. 13, 2009.
Second Office Action for Chinese patent application No. 200680015575.4, dated Sep. 25, 2009.
Third Official Action for Russian patent application No. 2008116682, dated Sep. 11, 2009.
Notification on Results of Examining the Invention for Patentability from Russian patent application No. 2006145434 dated Aug. 1, 2008.
First Rejection Notice issued for Japanese patent application No. 2007-527282 dated Dec. 14, 2009.
First Office Action from Chinese Patent Application No. 2005800142124 dated Mar. 14, 2008.
First Official Action from Russian patent application 2008116682, dated Jan. 16, 2009.
Second Office Action from Chinese patent application 200580006438.X, dated Apr. 10, 2009.
The third Office Action from Chinese patent Application No. 200580014212.4, dated Dec. 19, 2008.
Examination Report of the European Patent Office in Application No. 05724190.3 dated Aug. 1, 2007.
The Official Communication from European patent application No. 05746241.8 dated Nov. 12, 2010.
The Minutes in accordance with Rule 124(4) EPC for European application No. 05746241.8 dated Nov. 4, 2010.
First Examination Report for Indian patent application No. 4676/CHENP/2006 dated Apr. 17, 2009.
Notification of Transmittal of the International Search Report and the Written Opinion for the international patent application No. PCT/US2010/047744 dated Dec. 10, 2010.
Fourth Official Action for Russian patent application No. 2008116682, dated Dec. 18, 2009.
English machine translation of JP2004208476 A.
"Every Little Helps," Economist, vol. 278, No. 8469, p. 78, Mar. 18, 2006.
"Thermal Design and Heat Sink Manufacturing & Testing—Total Thermal and Heat Sink . . . ," http://www.enertron-inc.com/enertron-products/integrated-heat-sink.php, Mar. 31, 2006.
Zahnd et al., "Piezoelectric Windmill. A Novel Solution to Remote Sensing," Japanese Journal of Applied Physics, v. 44, No. 3, p. L104-L105, 2005.
"Heat Pipe—Wikipedia, the free encyclopedia," http://en.wikipedia.org/wiki/Heat_pipe, Mar. 31, 2006.
"High Power Single PSE Controller With Internal Switch," Linear Technology LTC4263-1, p. 1-20.
Office Action from European patent application No. 07837769.4, dated Jul. 14, 2009.
First Office Action from Australian patent application No. 2005248759, dated Apr. 30, 2009.
Second Office Action from Australian patent application No. 2005248759, dated Aug. 28, 2009.
Office Action from Chinese Patent Application No. 200880110323.9, dated Jan. 29, 2012.
Written Opinion from Singapore Patent Application No. 201009093-4, dated Feb. 20, 2012.
Written Opinion and Search Report from the related Singapore patent application No. 201009226-0 dated Mar. 16, 2012.
Office Action from the related Russian patent application No. 2011101364 dated Feb. 8, 2012.
Communication Pursuant to Rules 161(1) and 162 EPC for application Serial No. EP 09767062.4, dated Jan. 27, 2011.
Communication pursuant to Rules 161 and 162 EPC from European patent application No. 09767057.4 dated Jan. 26, 2011.
Communication pursuant to Rules 161 and 162 EPC from European patent application No. 09767063.2 dated Jan. 28, 2011.
The International Search Report from PCT Application No. PCT/US2011/047026, dated Jul. 11, 2011, 4 pgs.
The Written Opinion from International Search Report from PCT Application No. PCT/US2011/047026, dated Jul. 11, 2011, 8 pgs.
Second Examination Report for Indian patent application No. 4676/CHENP/2006 dated Apr. 8, 2010.
The fourth Office Action from Chinese patent application No. 200580014212.4 dated Jul. 24, 2009.
Official Letter from Mexican patent application No. PA/A/2006/013488 dated Jun. 25, 2009.
Communication from corresponding EP application No. 08837236.2 dated Nov. 3, 2010.
Third Office Action for Chinese patent application No. 200680015575.4, dated Jun. 2010.
Decision on Refusal to Grant from Russian patent application No. 2006145434 dated Feb. 18, 2011.
1st Chinese Office Action for Chinese Application No. 200980122611.0, dated Nov. 23, 2011, 5 pgs.
2nd Chinese Office Action for Chinese Application No. 200680035248.5, dated Oct. 19, 2011, 22 pgs.
Communication Pursuant to Rules 161(1) and 162 EPC for application Serial No. EP 10752246.8, dated May 3, 2012.
Written Opinion for the corresponding Singapore patent application No. 2010092278 dated Feb. 16, 2012.

(56) References Cited

OTHER PUBLICATIONS

Communication pursuant to Rules 161(1) and 162 EPC for EP Application No. 10752246.8, dated May 3, 2012, 2 pages.
Written Opinion for Singapore Application No. 2010092278, dated Feb. 16, 2012, 9 pages.
Written Opinion for Singapore Application No. 2010092245, dated Jan. 6, 2012, 11 pages.
Japanese Office Action from Japanese Application No. JP 2011-514605, dated Jun. 19, 2012, 7 pages.
Second Office Action (with English translation) for Chinese Application No. 200680035248.5, dated Oct. 19, 2011, 22 pgs.
$1^{st}$ Chinese Office Action for Chinese Application No. 200980122611.0, dated Nov. 23, 2011, 5 pages.
Chinese Office Action from CN200980122835.1, dated Jul. 3, 2012.
Chinese Office Action from CN200980122761.1, dated Aug. 31, 2012.
First Office Action from Japanese Patent Application No. 2011514603, dated Jul. 10, 2012.
First Office Action from Chinese Patent Application No. 200980122613.X, dated Aug. 15, 2012.
Second Office Action from Chinese Patent Application No. 200980122611.0, dated Aug. 20, 2012.
Official Action from Canadian Patent Application No. 2563337, dated Sep. 4, 2012.
Official Action from related Russian Patent Application No. 2009139488, dated Oct. 8, 2012, 7 pages.
Examination Report for the related Singapore Application No. 201009226-0, dated Oct. 12, 2012.
Invitation to Response to Written Opinion for Singapore Application No. 201009093-4, dated Nov. 5, 2012.
First Office Action dated Nov. 29, 2013 in related Chinese Patent Appln. Serial No. 201110213726.X. 13 pgs. including English Translation.
Communication Pursuant to Rules 161(1) and 162 EPC for application Serial No. EP 10765871.8, dated Apr. 27, 2012.
Office Action from Russian patent application No. 2011101386 dated Apr. 23, 2012, 4 pages.
Official Action from the related Canadian patent application No. 2726613 dated Jan. 11, 2013.
Official Action from the related Canadian patent application No. 2726608 dated Dec. 5, 2012.
Examination Report from the related Singapore patent application No. 2010092278 dated Jan. 7, 2013.
Decision of Rejection (final rejection) for Japanese Patent Application No. 2011-514604, dated Jan. 29, 2013, 8 pages.
Second Office Action for Chinese Patent Application No. 200980122835.1, dated Mar. 15, 2013, 20 pages.
Official Action for Canadian Patent Application No. 2,726,601, dated Apr. 12, 2013, 3 pages.
Second Office Action from Chinese patent application No. 200980122613.X, dated May 9, 2013.
First Office Action from the related Japanese patent application No. 2012-527988, dated May 14, 2013.
Office Action from the realated Japanese patent application No. 2012527994 dated Jun. 11, 2013.
International Search Report and Written Opinion of Application No. PCT/US2012/061281, dated Jan. 22, 2013.
Rejection Notice from JP 2011-514611, dated Aug. 20, 2012, 5 pgs.
International Search Report and Written Opinion of Application No. PCT/US2010/047744 dated Dec. 10, 2010.
Third Chinese Office Action dated Sep. 24, 2013 in Chinese appln. No. 200980122835.1. 21 pages with English Translation.
First Office Action dated Jan. 28, 2014 in related Japanese Patent Appln. Serial No. 2013-524161, 5 pgs including English Translation.
Second Office Action dated Apr. 28, 2014 in related Chinese Patent Application No. 201110213726.X, 10 pages including English Translation.
Office Action from Chinese patent application No. 200980122835.1 dated Sep. 24, 2013.
Office Action from Chinese patent 200110213726.X dated Nov. 29, 2013.
Chinese Office Action from CN200980122761.1, dated Dec. 12, 2013.
First Office Action (Notification of Reasons for Rejection) dated Jan. 28, 2014 in related Japanese Patent Application No. 2013-524161. 5 pgs including English Translation.
$3^{rd}$ Office Action dated Jan. 17, 2014 in Chinese Patent Application No. 200980122613.X, 9 pgs including English translation.
Office Action from Chinese Application No. 200980122835.1, dated Apr. 9, 2014.
Office Action from Application No. CN201210042907.5, dated Apr. 1, 2014.
Communication from EP Application No. 12787964.1, dated Jun. 25, 2014.
Examination Report of the European Patent Office from EP No. 05724190.3, dated Aug. 1, 2007.
Office Action from Russian Application No. RU 2013110497, dated Jul. 18, 2014.
Office Action from Chinese patent 201110213726.X, dated Aug. 28, 2014.
Office Action from Chinese patent 201210057973.X dated Nov. 28, 2013.
Office Action from Chinese patent 201210057973.X dated Jul. 31, 2014.
Office Action from Canadian patent application No. 2,808,174, dated Aug. 20, 2014.
Office Action from Chinese patent 200110213726.X dated Aug. 28, 2014.
Second Office Action from Chinese patent application No. 200680035248.5, dated Oct. 19, 2011.
Office Action from Japanese Patent Application No. 2013-524161, dated Dec. 2, 2014.
Communication from EP Application No. 12787964.1, dated Mar. 9, 2015.
Office Action from Japanese Patent Application No. 2014-538858, dated Apr. 7, 2015.
Office Action from Chinese Patent Application No. 201210042907.5, dated May 14, 2015.
Office Action from European Patent Application No. 11754949.3, dated Sep. 7, 2015.
Office Action from Japanese Patent Application No. 2013-524161, dated Nov. 24, 2015.
Office Action from Canadian Patent Application No. 2,808,174, dated Oct. 2, 2015.
Communication from European Patent Application No. 10752246.8, dated Sep. 8, 2015.
Office Action from Chinese Patent Application No. 201210042907.5, dated Nov. 3, 2015.
Office Action from Japanese Patent Application No. 2015-068905, dated Mar. 29, 2016.
Office Action from Canadian Patent Application No. 2,808,174, dated Jul. 4, 2016.
Office Action from Canadian Patent Application No. 2,808,174, dated May 19, 2017.
Communication from European Patent Application No. 11754949.3, dated May 31, 2017.
Decision to Refuse from European Patent Application No. 11754949.3, dated Dec. 7, 2017.
Minutes from European Patent Application No. 11754949.3, dated Dec. 6, 2017.
First Examination Report from Indian Patent Application No. 993/CHENP/2013, dated Jan. 11, 2018.
Office Action from Canadian Patent Application No. 2,808,174, dated Apr. 17, 2018, 8 pages.
Subsequent Examination under sections 12 & 13 of the Patents Act, 1970 and the Patent Rules, 2003 from Indian Patent Application No. 993/CHENP/2013, dated May 15, 2018, 2 pages.
Office Action from Canadian patent application No. 2,808,174, dated Dec. 27, 2018.
Official Action for the corresponding Russian patent application No. 2011101386 dated Dec. 23, 2011.

(56) References Cited

OTHER PUBLICATIONS

Communication from Indian Patent Application No. 993/CHENP/2013, dated Jun. 9, 2020.

* cited by examiner

WIRELESS ADAPTER WITH PROCESS DIAGNOSTICS

BACKGROUND OF THE INVENTION

The present invention relates to industrial process control or monitoring systems in which field devices are used to monitor or control an industrial process. More specifically, the present invention relates to wireless process control or monitoring systems.

Process control or monitoring systems are used in industrial processes to monitor or control the operation of the process. Example industrial processes include oil refineries, manufacturing plants, etc. A process variable transmitter is located at a field location and used to measure and transmit a process variable, such as pressure, flow, temperature, etc., to another location such as a central control room. Control field devices are placed in the field and can receive commands from the control room, for example, to control operation of the process. For example a control element can be configured to change the position of a valve, adjust the temperature of a heating element, etc., thereby control a process variable.

Such systems have typically operated using wired connections. One wiring technique is a two-wire process control loop in which the same two wires are used to communicate with the field device as well as provide power to the field device. However, more recently wireless communication techniques have been used to communicate information in process control or monitoring systems. These techniques can include, for example, wireless "mesh network" communication techniques or direct communication links.

It is frequently desirable to diagnose operation of the industrial process. Such diagnostics include, for example, identifying a component of the process which has failed or which is in the process of failing. This allows the failure to be repaired, perhaps before the component ultimately fails, thereby improving reliability and reducing downtime.

SUMMARY

A process device with diagnostics for use in an industrial process includes a process variable sensor or controller element which is configured to sense or control a process variable of a process fluid of the industrial process. Circuitry is coupled to the process variable sensor or control element and configured to measure or control a process variable of the industrial process. A wireless communication adapter includes wireless communication circuitry configured to communicate in the industrial process. The wireless communication circuitry is further configured to receive one or more process signals from one or more other process devices. Diagnostic circuitry is configured to diagnose operation of the industrial process as a function of the sensed process variable and the received process signal.

DETAILED DESCRIPTION

Figure 1:
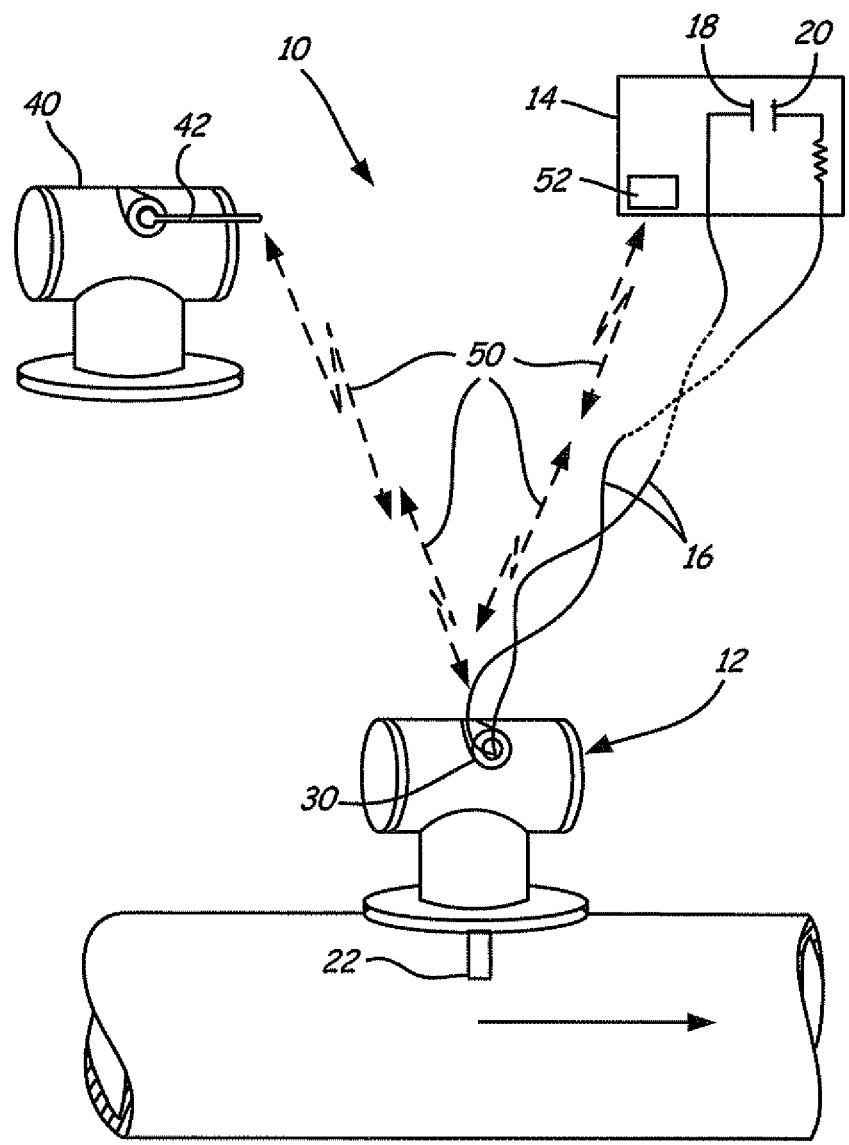
FIG. 1 is simplified block diagram of an industrial process control system including a field device having a wireless adapter in accordance with the present invention.

Proper operation of an industrial process is important for a number of reasons including plant throughput, uptime, quality, energy costs, environmental impact, operation and maintenance costs, and others. Thus, it is important that operation of the industrial process be properly diagnosed. In industrial process, a typical configuration includes a field device which provides a single process interface element, such as a process variable sensor or a control element, used to interact with the industrial process. The field device transmits information to, or receives information from, another location such as a central location. There are instances when it may be desirable to receive information from more than a single device. However, field devices typically do not provide a mechanism for peer to peer real time communications. Further, there are many different types of field devices which can be implemented in numerous configurations. This makes it difficult to implement applications at the device level which are able to utilize information received from other field devices.

The present invention provides a wireless adapter which can be coupled to a field device to provide wireless communication ability to the field device. The wireless adapter includes processing circuitry configured to receive information from the attached device, as well as information from other field devices, over the wireless network. The processing circuitry is capable of applying preconfigured rules including device, automation, network derived, or user definable rules, to the information for use in providing diagnostic information, determining performance information or determining other types of information. The adapter is capable of reporting such information over the wireless network or providing it to the field device. The adapter can be configured to implement rules including alarm or event determination, calculating results, conveying actions to automation platforms or plant personnel, configuring information to business applications, indicating that the process has deviated from desired conditions, efficiency, costs, or remaining life, provide safety or environmental impact information, or provide other types of information.

The wireless adapter (wireless communication module) of the invention is capable of receiving various types of data including process variables, control signals or diagnostic signals. Process variables are typically the primary variables which are being controlled in a process. As used herein, process variable includes any variable which describes the condition of the process such as, for example, pressure, flow, temperature, product level, pH, turbidity, vibration, position, motor current, any other characteristic of the process, etc. Control signals includes any signal (other than a process variable) which is used to control the process. For example, control signal includes a desired process variable value (i.e. a setpoint) such as a desired temperature, pressure, flow, product level, pH or turbidity, etc., which is adjusted by a controller or used to control the process. Additionally, a control signal can include calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system. Furthermore, process signal includes any signal which is related to the process or element in the process such as, for example, a process variable, a control signal or a diagnostic signal. Process devices include any device which forms part of or couples to a process control loop and is used in the control or monitoring of a process.

FIG. 1 is simplified diagram showing an industrial process control or monitoring system 10 which includes a field device 12 is illustrated as communicating with a control room 14 over an optional process control loop 16. Control room 14 is illustrated as including a power supply 18 and a sense resistor 20 coupled to the process control loop 16. The field device includes a process interface element 22. The process interface element can comprise a process variable sensor for sensing a process variable of the process fluid if the field device 12 is configured to operate as a process variable transmitter. Similarly, the process interface element 22 can comprise a control element such as a valve, heater, cooler, vibrator, pump, etc., if the field device 12 is configured to operate as a controller. Field device 12 includes a wireless adapter 30 in accordance with the present invention. FIG. 1 also illustrates a second field device 40 having a second field device wireless adapter 42. Wireless adapters 30 and 42 are configured to form a wireless communication link 50. In the example shown in FIG. 1, control room 14 also includes wireless communication circuitry 52. In this configuration, field devices 12 and 40 can communicate with each other over the wireless communication link 50 and may also communicate with the control room 14 over wireless communication link 50 using communication circuitry 52. The communication link 50 can be in accordance with any desired standard including, for example, a mesh network configuration in which data can be transferred between devices until the data reaches its ultimate location in a manner which ensures robust communication of information.

Figure 2:
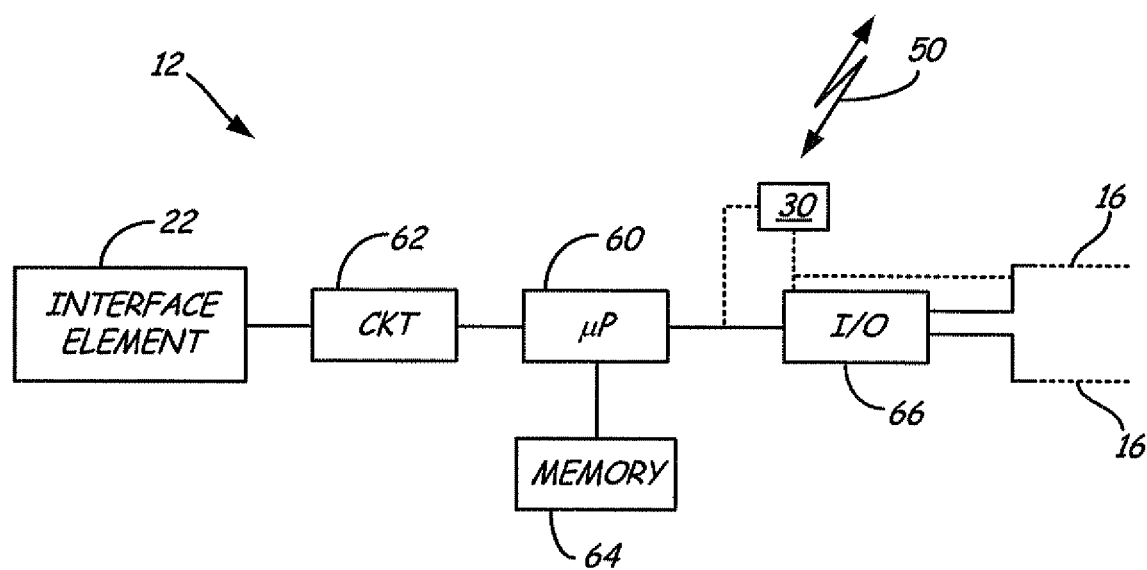
FIG. 2 is a simplified block diagram of the field device in FIG. 1.

FIG. 2 is a simplified diagram of process device 12 and illustrates interface element 22 coupled to a microprocessor 60 through circuitry 62. Circuitry 62 can comprise, for example, a digital to analog converter if interface element 22 is configured as a control element or can include a analog to digital converter if interface 22 is configured as a sensor. Microprocessor 60 is illustrated as coupled to a memory 64 which can contain programming instructions and other information. I/O (input/output) circuitry 66 is shown coupled to optional process control loop 16. The wireless adapter 30 can be coupled to circuitry in the field device 12 in accordance with any appropriate configuration. In the example shown in FIG. 2, optional connectors are shown between wireless adapter 30 and microprocessor 60, I/O circuitry 66 or process control loop 16. Example configurations of the wireless adapter and its connection to a field device are shown in U.S. Pat. No. 7,262,693, issued Aug. 28, 2007, PROCESS FIELD DEVICE WITH RADIO FREQUENCY COMMUNICATION; U.S. application Ser. No. 10/850,828, filed May 21, 2004, entitled WIRELESS POWER AND COMMUNICATION UNIT FOR PROCESS FIELD DEVICE; U.S. application Ser. No. 11/842,356, filed Aug. 21, 2007, entitled PROCESS FIELD DEVICE WITH RADIO FREQUENCY COMMUNICATION; U.S. application Ser. No. 12/125,187, filed May 22, 2008, entitled RF ADAPTER FOR FIELD DEVICE; U.S. application Ser. No. 12/485,169, filed Jun. 16, 2009, entitled WIRELESS COMMUNICATION ADAPTER FOR FIELD DEVICES; U.S. application Ser. No. 12/485,189, filed Jun. 16, 2009, entitled FORM FACTOR FOR ELECTROMAGNETIC INTERFERENCE PROTECTION FOR PROCESS DEVICE WIRELESS ADAPTERS; U.S. application Ser. No. 12/486,253, filed Jun. 17, 2009, entitled RF ADAPTER FOR FIELD DEVICE WITH LOOP CURRENT BYPASS; U.S. application Ser. No. 12/486,269, field Jun. 17, 2009, entitled RF ADAPTER FOR FIELD DEVICE WITH LOW VOLTAGE INTRINSIC SAFETY CLAMPING; U.S. application Ser. No. 12/486,282, filed Jun. 17, 2009, entitled RF ADAPTER FOR FIELD DEVICE WITH VARIABLE VOLTAGE DROP, the contents of which are hereby incorporated by reference in their entirety.

Figure 3:
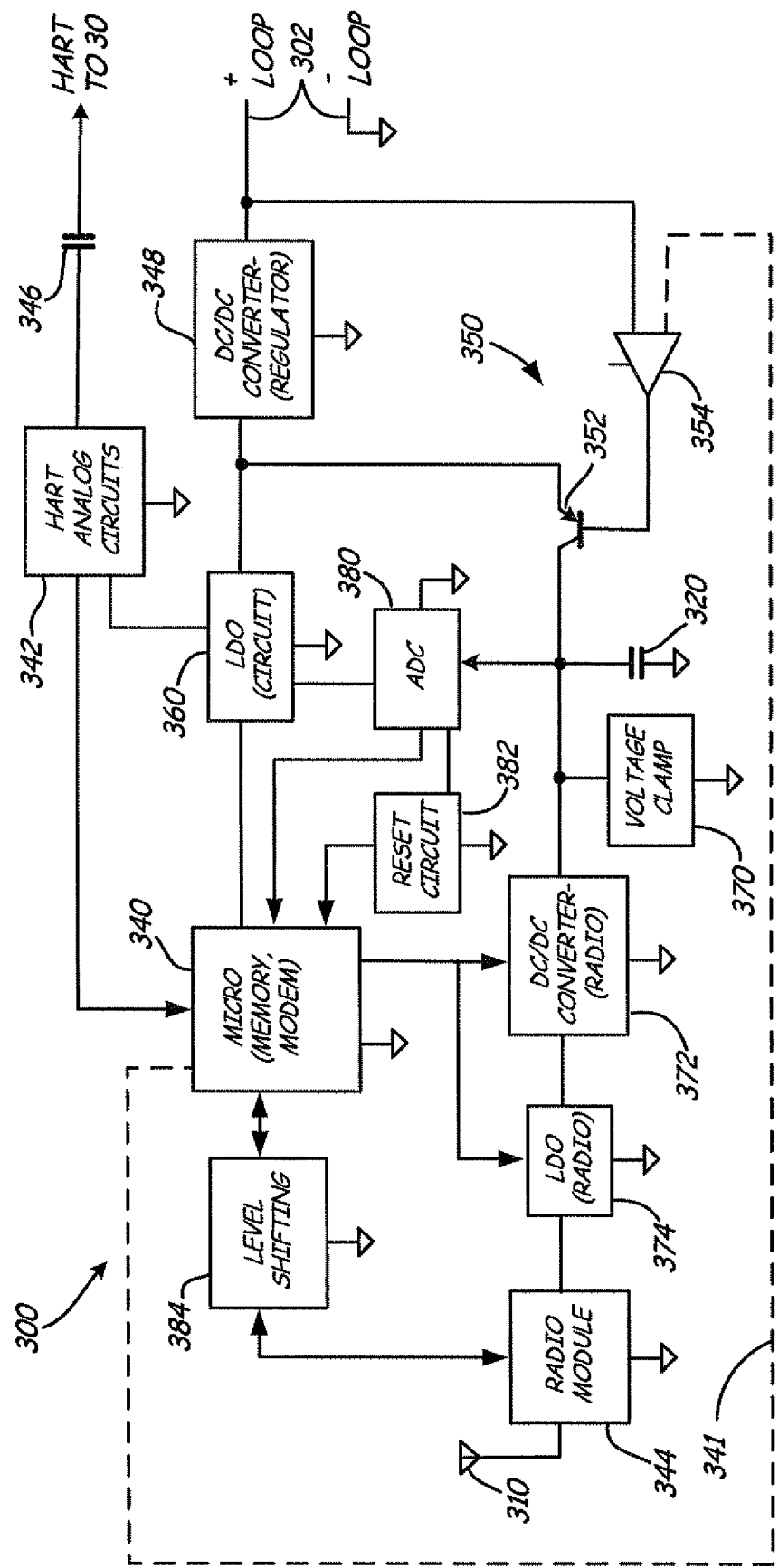
FIG. 3 is a simplified block diagram of the wireless adapter of a type which is coupled to the field device of FIGS. 1 and 2.

FIG. 3 is a simplified block diagram of the adapter 300 which shows various circuitry blocks. A super capacitor 320 is illustrated and the device 300 is configured for HART® wired communication as well as wireless communication such as according to the wireless HART® standard (IEC standard 62591).

As illustrated in FIG. 3, adapter 300 includes a microcontroller 340 which also includes a memory and a modem for communication. The memory is used to store programming instructions, configuration data, variables, etc. HART® analog circuitry 342 is configured to couple to the process variable transmitter 308 through a DC blocking capacitor 346. A radio module 344 is provided to enable adapter 300 to communicate using RE communication techniques. A series connected regulator 348 is provided which is configured as a DC to DC converter. A current shunt circuit 350 is connected in parallel with regulator 348 and includes a bypass transistor 352 controlled by an OP amp 354. OP amp 354 operates based upon a difference between a reference voltage ($V_{ref}$) and the voltage applied to the regulator 348. Regulator 348 provides a 2.3 volt output to a low dropout (LDO) regulator 360. Low dropout (LDO) regulator 360 provides a regulated 2 volt power supply output to the microprocessor 340, HART analog circuits 342, reset circuit 382 and ADC 380.

The current through bypass transistor 352 is used to charge the super capacitor 320. The voltage across the super capacitor 320 is set using a voltage clamp 370. For example, the voltage clamp can be set to 2.2 volts. Another DC to DC converter 372 is configured as a step up converter and provides a regulated voltage output of 3 volts to a low dropout (LDO) regulator 374. The output of low dropout (LDO) regulator 374 is set to 2.8 volts and used to provide regulated power to radio module 344.

The microprocessor 340 is connected to an analog to digital converter 380 which is used to monitor the voltage of super capacitor 320. Microprocessor 340 is also connected to a reset circuit 382. Microprocessor 340 provides data to the radio module 344 through a level shifting circuit 384.

It is preferable that the circuitry be able to support the maximum amount of wireless communication activity while dropping a minimum amount of voltage in the loop 302. Therefore, the adapter 300 is preferably configured to use power from the loop 302 in a very efficient manner. In one specific configuration, this can be achieved by using a low power microcontroller 340, for example, Texas Instruments MSP430F1481 and by using low power analog circuit components. These components can be powered by a low supply voltage to also minimize the total circuit power consumption. Further, the microcontroller 340 can be configured to enter a "sleep" mode if desired when certain functions are not needed, for example communication functions. In the configuration shown in FIG. 3, a separate modem is not utilized. Instead, the microcontroller 340 is used to provide modem functionality.

It is also preferable to provide the radio module 344 with a large amount of power. This allows more frequent communication and increased reliability. The additional power can be used to publish information from the transmitter 308, allow the adapter 300 to be used as a router for other process transmitters, for example in a mesh network and allow higher transmit power to be used. This can result in a more reliable mesh network, as the path from another wireless device through the adapter 300 to a host may be more reliable than the path which is directly from the device to the host.

In the embodiment of FIG. 3, the radio module 344 is powered by super capacitor 320. Therefore, in order to increase the power which is provided to the radio module 344, it is preferable to increase the power stored by super capacitor 320. In the configuration of FIG. 3, this is achieved by arranging the super capacitor 320 as a shunt element for the regulator 348 which regulates the voltage drop across the terminals which couple to loop 302 in conjunction with OP amp 354 and shunt transistor 352. In FIG. 3, the voltage across the loop terminals which couple to the process control loop 302 is regulated to one volt. This is achieved by adjusting the current going to the super capacitor using OP amp 354 and shunt transistor 352. In this configuration, regulator 348 operates in series with the loop 302 and is in the feedback loop formed by OP amp 354. In a less efficient configuration, a separate one volt shunt regulator and super capacitor charging circuit may be implemented. However, this requires additional components and additional power to operate. In contrast, in the configuration set forth in FIG. 3, any loop current which is not used by the circuitry of adapter 300 is directed into shunt capacitor 320 for increased efficiency. This results in the maximum amount of power being available for radio module 344. The voltage clamp 370 determines the voltage to which capacitor 320 is charged. Once the super capacitor 320 reaches the voltage set by the voltage clamp 370, the excess current flows through clamp 370 rather than into capacitor 320.

DC to DC converter 348 is configured as a low power "step up" switching regulator that operates with an input voltage of 1 volt. Regulator 348 increases the 1 volt input voltage to a sufficiently high voltage to power the remaining circuitry. In the example of FIG. 3, this is 2.3. volts. The converter can be a switched capacitor type converter, an inductor based boost converter, a transformer based converter or other appropriate configuration. The LDO regulator 360 regulates the 2.3 volt output from regulator 348 to 2.0 volts and removes any switching noise from the regulator 348. The output from the LDO regulator 360 is used to power the microprocessor 340, HART® analog circuits 342, memory, reset circuitry 382, and analog to digital converter 380.

HART® analog circuit block 342 can comprise, for example, a carrier detect circuit, a receive circuit and a transmit circuit. Preferably, these circuits are configured to have low power requirements while maintaining acceptable communications integrity. The memory in microprocessor 340 can be used to store programming code and temporary variables. Timers which are internal to microprocessor 340 can be used to provide a "software" modem functionality. The memory of the microprocessor 340 may include internal flash memory, RAM as well as EEPROM or other non volatile memory. The microcontroller 340 can be configured to monitor the voltage access super capacitor 320 using analog to digital converter 380 which provides a digital output to microcontroller 340 representative of the capacitive voltage. If desired, the microcontroller 340 can be used to determine whether the capacitor has a sufficient voltage to support radio transmission. Reset circuit 382 can be used to ensure that microcontroller 340 does not operate when the voltage is insufficient. For example, the reset circuit 382 can be configured to reset, or turn on, the microcontroller 340 when the supply voltage from LDO regulator 360 reaches a sufficient voltage level. The circuitry can also be used to reset the microcontroller 340 if a power "glitch" occurs.

Radio module 344 operates on a stable voltage of 2.8 volts provided by LDO regulator 374. As discussed above, if the super capacitor 320 is charged to 2.2 volts, the DC to DC converter regulator 372 steps up the voltage to 3 volts. During use, the voltage on the super capacitor will decrease and the step up converter is needed. The LDO regulator 374 is used to provide a stable 2.8 volts to the radio module 344. Preferably, regulator 372 is configured to operate off a minimum voltage of about 1 volt up to a maximum voltage of about 2.2 volts. In some configurations, microcontroller 340 is configured to turn off circuitry of radio module 344 if the voltage on the super capacitor 320 is less than 1 volt.

Microcontroller 340 can be configured to transmit information wirelessly using the radio module 344 by communicating over digital communication lines between the radio module 344 and the microcontroller 340. As the microcontroller operates from a two volt power supply while the radio operates from a 2.8 power supply, the digital communication lines between the two components must be level shifted using level shifting circuitry 384. For example, this can be performed using very low power level translator circuits such as Texas Instruments SN74LVC2T45DCU.

In one configuration, the microcontroller 340 can be configured to adjust the voltage drop across the loop terminals which couple to loop 302. For example, an optional control line 341 from the microcontroller 340 can be coupled to the inverting input of OP amp 354 of the shunt circuitry 350. In such a configuration, additional power may be made available to the radio by increasing the loop voltage drop under appropriate conditions. Similarly, if the impact on the process control loop of the circuitry of adapter 300 needs to be reduced, the voltage drop can be decreased. However, this will provide less power to the radio module and other circuitry of adapter 300 and may degrade performance.

Figure 4:
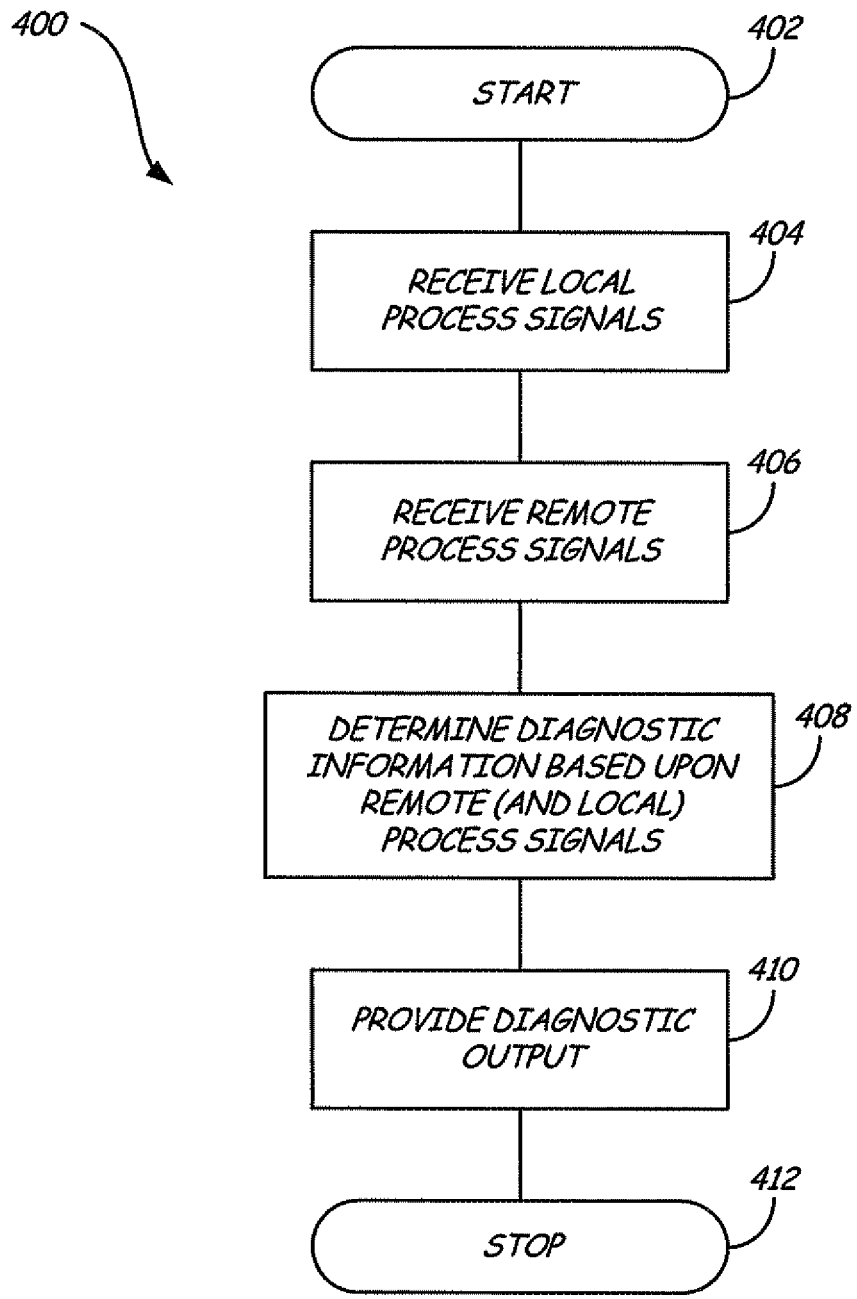
FIG. 4 is a simplified block diagram showing steps in accordance with the present invention.

FIG. 4 is a simplified flow chart 400 showing steps in accordance with one example embodiment of the present invention. Flow chart 400 begins at start block 402 and controls past to an optional block 404. At block 404, the wireless adapter is configured to receive local process signals from the field device to which it is coupled. At block 406, the wireless adapter 30 receives process signals from a remote device through communication link 50. At block 408, diagnostics steps are performed based upon the remote process signal and the optional local signal. The diagnostics can be based upon any number of local and/or remote process signals. At block 408, diagnostic information is determined and control is passed to block 410. At block 410, the wireless adapter 30 provides a diagnostic output. This diagnostic output can be provided locally to the field device 12, or can be sent to remote location, for example, through wireless communication link 50 or through two wire process control loop 16. The process is completed and terminated at stop block 412. The steps shown in FIG. 4 can be actuated automatically based upon a detected occurrence, such as an occurrence detected in the process, can be actuated, periodically, or can be initiated remotely when wireless adapter 30 receives a command to begin performing diagnostics. The steps shown in Figure can be implemented in microprocessor 4 of the field adapter 30. These steps can be in accordance with programming instructions stored in memory 64. This configuration provides the ability to perform diagnostics in a field device using data from multiple devices. This allows a single device to have access for diagnostic purposes to process signals from multiple other devices.

One example application is the detection of leaking process fluids around a fully closed valve. In such an example configuration, a flow sensor is positioned upstream of a control valve. When the valve is fully closed, no fluid flow should flow past the flow sensor. If the valve is fully closed and there is sufficient pressure against the valve seat, flow should be completely stopped. However, valves and valves seats wear with age. This wearing can result in incomplete seating of the valve against the valve seat resulting in fluid flow past the valve when in "a fully closed" position.

Figure 5:
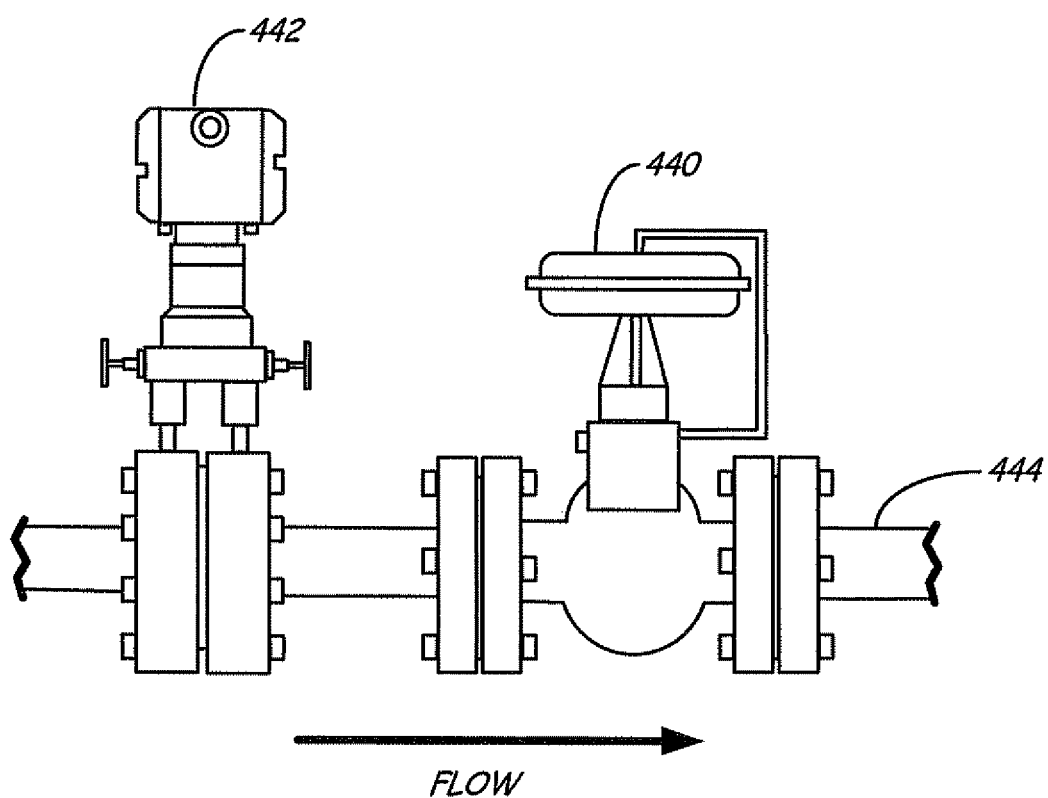
FIG. 5 is a diagram showing the present invention implemented in a process variable transmitter and a valve controller.

FIG. 5 is a diagram showing a valve controller 440 and a flow meter 442 coupled to process piping 444. In this configuration, controller 440 and transmitter 442 each include a wireless adapter 30. Either wireless adapter 30 can receive wireless signal (flow rate or valve position) from the wireless adapter 30 of the other device. In this configuration, the diagnostic rule implemented at block 408 shown at FIG. 4 can be as follows:

If valve is closed and seat pressure is between X and Y and flow is >0, then the valve is leaking or the flow sensor is in error.

Flow may continue past the cflow meter when the valve is completely closed for a short period of time. The rule can be implemented to account for this delay. The rule can also be adjusted based upon communication lag between devices. This communication lag can be determined by monitoring communication over wireless communication link 50, can be determined based upon time stamps, can be programmed by an operator, etc.

Figure 6:
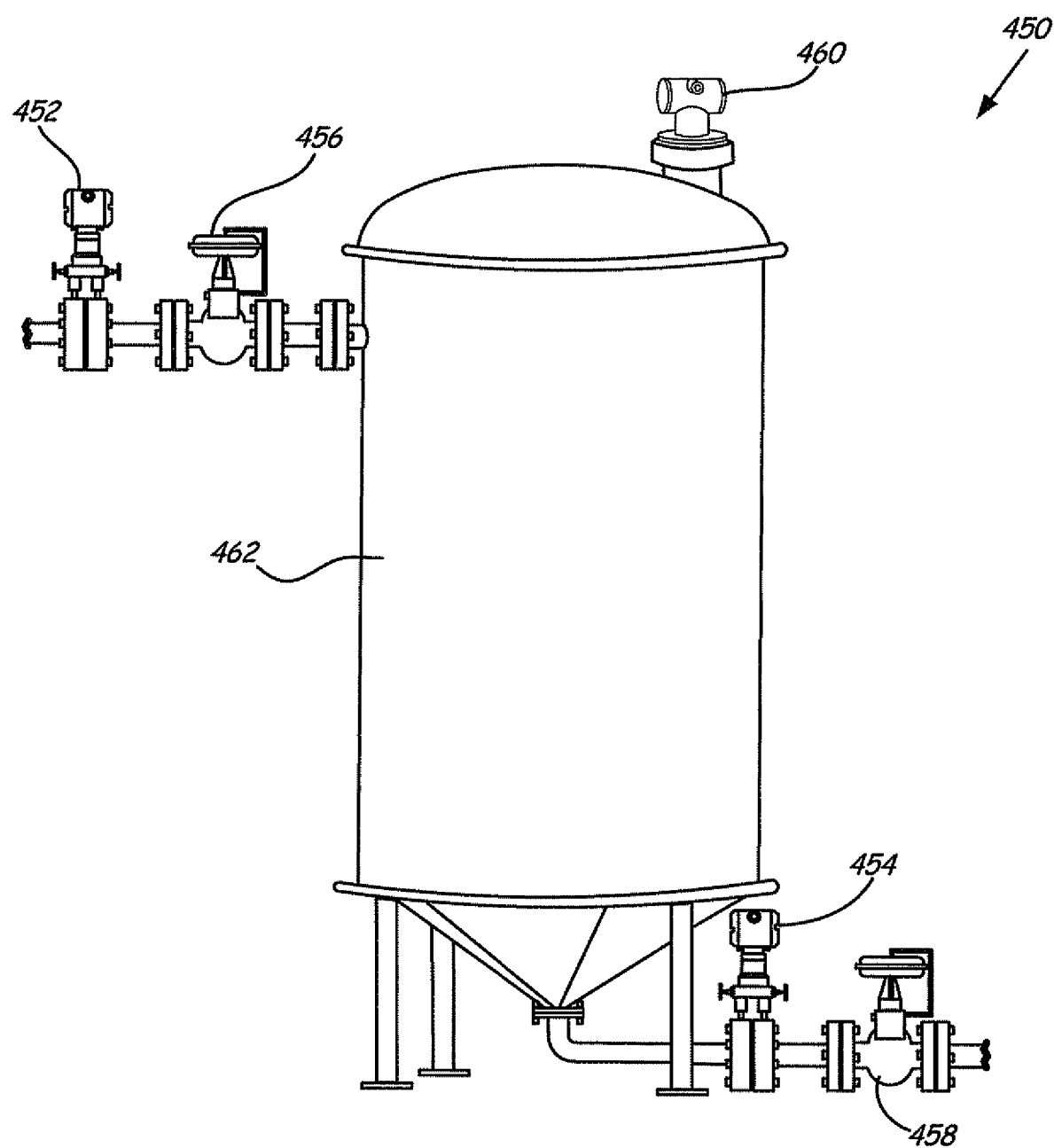
FIG. 6 is a diagram showing the present invention for use in detecting leakage of a tank.

FIG. 6 is another example implementation of the present invention. In FIG. 6, process flow transmitters 452 and 454 are provided and coupled to adjacent valve controller 456 and 458, respectively. A level meter 460 is coupled to a tank 462. Flow transmitter 452 and valve controller 456 couple to an inlet to tank 462 and flow transmitter 454 and valve controller 458 are coupled to an outlet from tank 462. If wireless adapters 30 are coupled to transmitters 452 and 454, and to level meter 460, a rule can be implemented to identify a potential leak in the tank 462. Such a rule can be as follows:

If tank in flow equals 0 and tank outflow=0 and the tank level is decreasing, the tank may have a leak.

Additional diagnostics can be performed if valve controllers 456 and 458 include the wireless adapters 30. For example, a leaking valve could be identified.

In addition to performing diagnostics, the adapter 30 of the present invention can be used to improve efficiency. For example, valves provide a combination of accurate flow control and low energy loss when operating at approximately 70% open. If a wireless adapter is installed on a valve controller and associated flow transmitter as shown, for example, in FIG. 5, valve position versus flow rate can be monitored. Valves operating outside the preferred range for efficient operation can be identified. Corrective action can be taken such as reducing a size of an associated pump to reduce energy consumption. Additionally, if energy cost information is provided to a wireless adapter 30, real time energy costs of excess energy consumption can be calculated and reported. If a field device comprises a pump motor which is equipped with a wireless adapter, motor speed and power consumption can be monitored and managed in real time to provide increased energy savings and improved performance of the associated control valve.

The present invention can be implemented in a large industrial process. For example, many different types of field devices and configurations may be implemented in an industrial process and configured to communicate using different protocols. The wireless adapter 30 of the present invention can be coupled to any of these field devices and thereby provide for communication of process signals between the different types of field devices for use in implementing diagnostics or for other purposes. Further, the wireless adapter 30 can be used to retrofit existing field devices.

Although the present invention has been described with reference to preferred embodiments, workers skilled in the art will recognize that changes may be made in form and detail without departing from the spirit and scope of the invention. The diagnostic output can be provided over a wireless communication link or can be transmitted over a two-wire process control loop. The wireless adapter can communicate with the process device using an analog or a digital protocol. The diagnostics can be based upon a local process signal and a process signal received from another process device. The present invention can be used with other field devices and configurations than those specifically illustrated or discussed herein. Further, more complex diagnostic rules can be implemented including those based upon statistical parameters, fuzzy logic, weighting functions, etc. The diagnostics can be based upon further analysis of the process signals including analysis in the time or frequency domains. A local process signal is a process signal which originates at a local location such as with a process device. A remote process signal is a process signal received from another location, such as from another process device. Diagnostic rules including but not limited to logic, data sources, data users, or other types can be sent to a field device, edited, deleted, or copied from one or more field devices to other field devices using wired or wireless communications techniques in any combination. This allows diagnostics to be created, deleted, modified, or reused as needed.

What is claimed is:
1. A wireless adapter for connection to a process variable transmitter field device in an industrial process comprising:
   a two-wire process control loop;
   a wireless communication circuit comprising at least two connections to the two-wire process control loop to receive power from the two-wire process control loop, the wireless communication circuit having a third connection to wirelessly receive a remote process signal from a separate remote process field device that forms part of a process control system for controlling an industrial process;

a wired communication circuit comprising at least two connections to the process control loop, the process control loop to power the connected process variable transmitter field device that is part of the process control system, the wired communication circuit to receive a local process signal from the connected process variable transmitter field device over the wired connection to the connected process variable transmitter field device, wherein the wireless adapter is further configured to be mounted to the process variable transmitter field device;

a memory which stores a diagnostic rule which defines a relationship between the wirelessly received remote process signal and the local process signal;

diagnostic circuitry to provide a diagnostic result to the wireless communication circuit or the wired communication circuit, the diagnostic result based upon the diagnostic rules stored in the memory which defines a relationship between the wirelessly received remote process signal from the separate remote process field device and the local process signal from the connected process variable transmitter field device, the diagnostic result being indicative of a condition of the process control system, and the diagnostic result based on a correlation between the wirelessly received remote process signal and the local process signal;

wherein one of the remote process signal and the local process signal is a process variable control signal and another of the remote process signal and the local process signal is a sensed process variable.

2. The wireless adapter of claim 1 wherein the connected process variable transmitter field device comprises a process variable sensor and the local process signal comprises a sensed process variable.

3. The wireless adapter of claim 1 wherein the connected process variable transmitter field device comprises a control element and the local process signal is related to a set point.

4. The wireless adapter of claim 1 wherein the wireless communication circuitry operates in accordance with a mesh network.

5. The wireless adapter of claim 1 wherein the wired communication circuitry receives the local process signal in accordance with a digital communication protocol.

6. The wireless adapter of claim 1 wherein the wireless adapter is configured to couple to terminals of the connected process variable transmitter field device which connect to a two-wire process control loop.

7. The wireless adapter of claim 1 wherein the diagnostic circuitry is configured to identify a leaking valve.

8. The wireless adapter of claim 1 wherein the diagnostic circuitry is configured to identify a leaking tank.

9. The wireless adapter of claim 1, wherein the wireless process signal is a control signal.

10. The wireless adapter of claim 1, wherein the wireless process signal is a process variable.

11. The wireless adapter of claim 1, wherein the third connection is a digital HART® connection.

12. The wireless adapter of claim 1, wherein the adapter is configured to implement rules including alarm or event determination, calculating results, conveying actions to automation platforms or plant personnel, configuring information to business applications, indicating that the process has deviated from desired conditions, efficiency, costs, or remaining life, provide safety or environmental impact information, or provide other types of information.

13. The wireless adapter of claim 1, wherein the adapter is further configured to receive data including process variables, control signals or diagnostic signals.

14. The wireless adapter of claim 13, wherein process variables comprise at least one of pressure, flow, temperature, product level, pH, turbidity, vibration, position, motor current, or any other characteristic of the process.

15. The wireless adapter of claim 13, wherein control signals comprise non-process variable signals for controlling the process.

16. The wireless adapter of claim 15, wherein non-process variable signals include at least one of a desired temperature, pressure, flow, product level, pH or turbidity of the process, calibration values, alarms, alarm conditions, a valve position signal, an energy level for a heating element, and a solenoid on/off signal.

17. The wireless adapter of claim 13, wherein diagnostic signals comprise signals that are not process variables and signals that are not control signals, and comprise information related to operation of devices and elements in the process control loop.

18. A method of performing coordinated diagnostics of an industrial process, comprising:

mounting a wireless adapter to a process variable transmitter field device at the field device;

powering the wireless adapter with at least two connections to a two-wire process control loop to receive power from the two-wire process control loop;

forming a wired connection between the wireless adapter and the connected process variable transmitter field device;

creating a wireless connection between wireless communication circuitry of the wireless adapter and a separate remote process field device;

receiving a remote process signal from the separate remote process field device through the wireless connection, the remote process signal received wirelessly from the remote process field device using the wireless communication circuitry of the wireless adapter;

receiving a local process signal from the connected process variable transmitter field device at the wireless adapter, the local process signal received over the wired connection between the connected process variable transmitter field device and the wireless adapter;

providing a memory which stores a diagnostic rule which defines a relationship between the wirelessly received remote process signal and the local process signal;

providing, by diagnostic circuitry of the wireless adapter, a diagnostic result to the wireless communication circuitry or the wired connection, the diagnostic result based upon the diagnostic rules stored in the memory which defines a relationship between the wirelessly received remote process signal and the local process signal, the diagnostic result indicative of operation of the industrial process;

wherein one of the remote process signal and the local process signal is a process variable control signal and another of the remote process signal and the local process signal is a sensed process variable.

19. The method of claim 18 including operating wireless communication circuitry in accordance with a mesh network.

20. The method of claim 18 including coupling the wireless adapter to terminals of the connected process variable transmitter field device which connect to a two wire process control loop.

21. The method of claim 18 wherein the diagnostic result identifies a leaking valve.

22. The method of claim 18 wherein the diagnostic result identifies a leaking tank.

\* \* \* \* \*